United States Patent Office 2,974,466
Patented Mar. 14, 1961

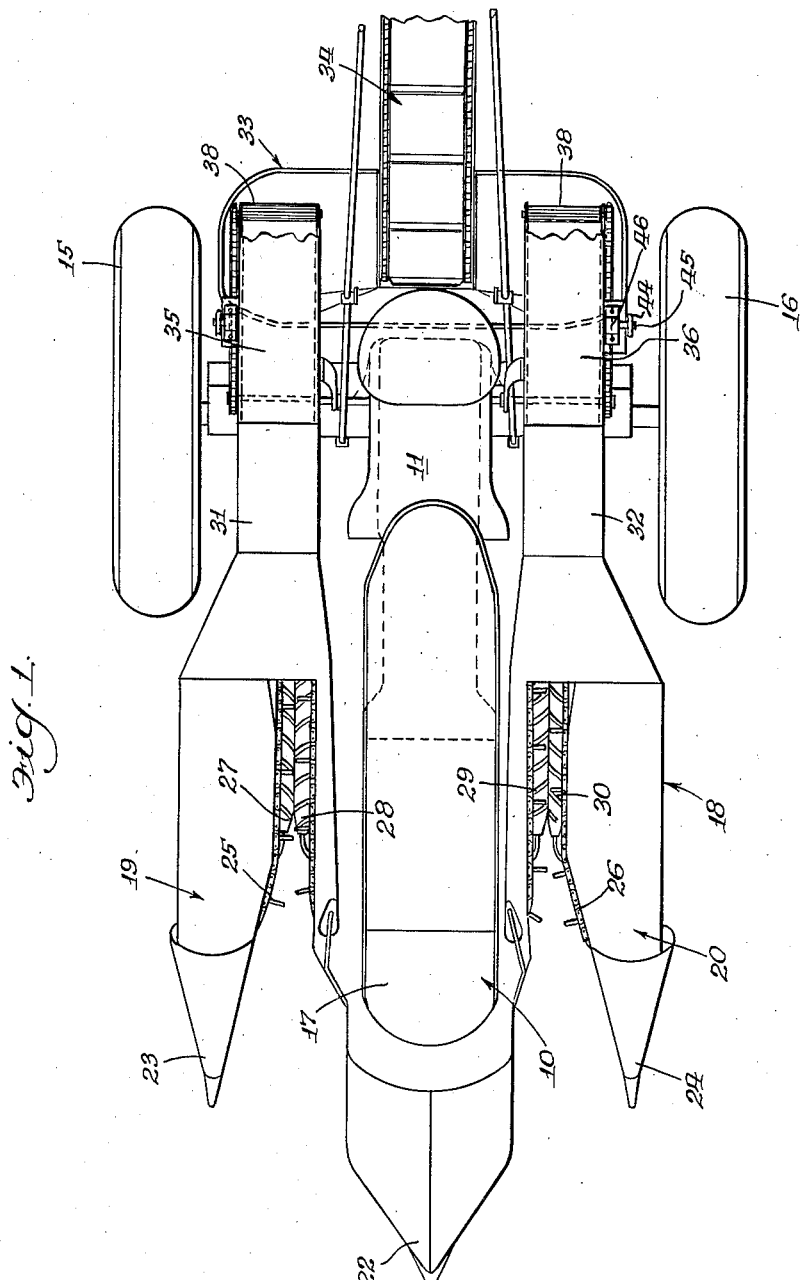

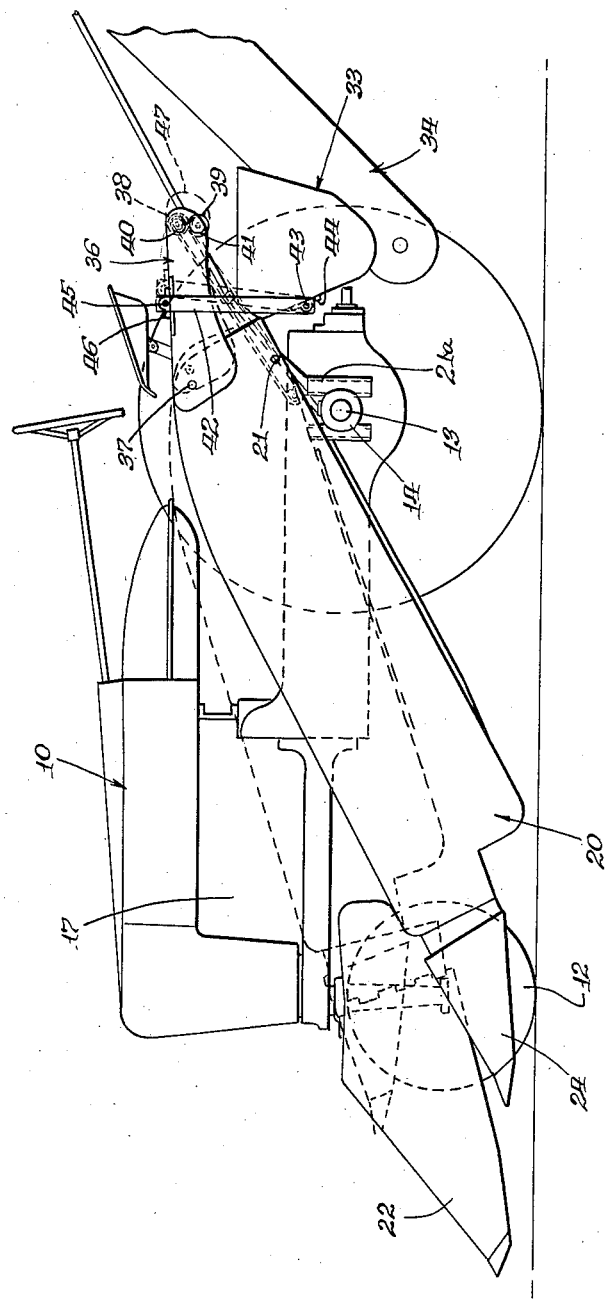

2,974,466
CORN PICKER

Benjamin M. Hyman, East Moline, Ill., assignor to International Harvester Company, Chicago, Ill., a corporation of New Jersey Filed Dec. 18, 1958, Ser. No. 781,287
3 Claims. (Cl. 56—18)

This invention relates to a new and improved corn picker.

The picking of corn by a field traversing machine requires a machine of unusual versatility. Certain corn stalks grow considerably higher than others and thus it is desirable to have the picker vertically adjustable to provide for the gripping of the stalk at a point higher or a greater distance spaced from the ground than with a short stalk. In order to obtain this result the pickers which are usually mounted on agricultural type tractors are pivotable on the tractor to raise or lower the forwardly extending picking units relative to the ground. As a rule the corn pickers of this type have corn receiving hoppers disposed at the rear of the picker and these hoppers are usually mounted stationary with respect to the carrying tractor. Thus the picking units pivot relatively to the receiving hoppers and the discharge ends of the picking units move relatively to the receiving hoppers such that in extreme positions of the picking units the angle of discharge into the receiving hoppers for the corn may be materially impaired. Under such circumstances it is conceivable the harvested corn could be lost by throwing the corn on the ground at the time of intended delivery to the receiving hopper. In many present day corn pickers there is also provided stalk or trash removing rolls immediately over the corn receiving hopper at the point of discharge of the picking units. These trash removing rolls are for the purpose of separating the trash from the corn as it is deposited into the receiving hopper. Inasmuch as the trash removing rolls are usually mounted on and form a part of the vertically adjustable corn picking units, they too have their position moved relative to the corn receiving hopper and in certain positions of the corn picking units the trash removing rolls will cause the trash to be deposited in the clean corn receiving hopper. This, of course, is undesirable.

It is a principal object of the present invention to provide a corn picker with means for effecting the discharge of harvested corn into the corn receiving hopper regardless of the vertical position of the corn picking units.

Another important object of this invention is the provision of means in a corn picker for insuring the discharge of trash, stalks and other undesirable material from the corn picker at a rearward portion thereof at a position separately from the deposit of clean harvested corn into a corn receiving hopper.

A further important object of this invention is to supply a hinged tubular housing on the upper rearward end of a corn picking unit having its discharge end disposed over a corn receiving hopper, and also having means for holding the discharge end of the hinged tubular housing relatively fixed with respect to the corn receiving hopper despite angular adjustments for vertical positioning of the forward end of the corn picking unit.

Another and further important object of this invention is to equip a corn picker with a hinged tubular housing at the rearward end thereof and including trash removing rolls mounted within the tubular housing and having linkage means arranged and constructed to maintain a general horizontal position of the tubular housing regardless of the vertical adjustment of the corn picking units whereby the corn discharged through said tubular housing will be deposited in the corn receiving hopper and the trash and other undesirable stalk material will be discharged by the trash removing rolls at a point over the top of the corn receiving hopper.

Other and further important objects and advantages will become apparent from the disclosures in the following specification and accompanying drawings.

In the drawings:

Figure 1 is a top plan view of the tractor mounted corn picker of this invention; and Figure 2 is a side elevational view of the device as shown in Figure 1.

As shown in the drawings, the reference numeral 10 indicates generally an agricultural type tractor having a longitudinally extending chassis or frame 11 which as shown in Figure 2 is supported at its front end by steerable wheels 12. The rear portion of the longitudinal and elongated chassis 11 is provided with transversely disposed axles 13 carried in a housing 14. Large traction wheels 15 and 16 are mounted on the axles 13 and thus support the rear of the tractor and supply the ground engaging traction for the vehicle. The forward portion of the tractor 10 has a generally elongated engine 17 which is disposed over and constitutes a part of the longitudinal frame or chassis 11.

The corn picker mounted on the tractor 10 shall be generally designated as 18. The picker includes spaced apart corn gathering or picking units 19 and 20. As best shown in Figure 2, the picking unit 20 is pivotally mounted at 21 on bracket structure 21a fixedly mounted with respect to the axle housing 14.

As shown in Figure 1, the corn picker is equipped with a center divider 22 which acts to guide the corn stalks either into one gathering unit or the other. The gathering unit 19 is provided with an outside divider point 23 and similarly the gathering unit 20 is provided with an outside gathering point 24. Thus the corn in one row passes between the center divider 22 and the outer gathering point 23 and thence into the corn picking unit 19. On the other side of the machine the row of corn passes between the center divider 22 and the outer gathering point 24 and thence into the corn picking unit 20. The detail construction of the corn picking units 19 and 20 have not been shown. However, in order to better depict the functions of each of these units, there has been shown gathering chains 25 and 26 to cause the stalks to be moved rearwardly into engagement by cooperative snapping rolls 27 and 28 in the unit 19 and 29 and 30 in the unit 20. The cooperative snapping rolls 27 and 28 and 29 and 30 are rotated inwardly and downwardly causing the corn bearing stalks to be pulled downwardly therebetween. When the stalks are pulled downwardly to the point of junction with the ears hanging thereon, the ears are caused to be snapped or stripped from the stalks and the gathering chains 25 and 26 move the snapped ears of corn upwardly and rearwardly through tubular housings 31 and 32 in the picking units 19 and 20 respectively.

A corn receiving hopper 33 is fixedly mounted relative to the tractor behind the rear axle housing 14. The function of the hopper 33 is to receive corn picked from the field by the corn picking units 19 and 20 and severed from the stalks by the snapping rolls. Following delivery of the corn to the receiving hopper 33, the ears fall inwardly toward the center of the hopper and into a wagon elevator 34 which is arranged and constructed to carry the ears of corn upwardly and rearwardly for discharge into a trailing wagon (not shown).

The upper rearward ends of the corn picking and gathering units 19 and 20 are provided with tubular housing members 35 and 36. These tubular housings are hinged as shown at 37 in Figure 2 to the upper rearward ends of the gathering units 19 and 20 at a position spaced above the hinging 21 of the gathering units to the stationary brackets fastened to the tractor 10. Any trash or broken stalks which may come rearwardly with the harvested and snapped ears of corn are also propelled through the tubular housings 35 and 36 and for this reason cooperative trash removing rolls 38 and 39, as best shown in Figure 2, are arranged at the point of discharge of the tubular housings to cause the trash and broken stalk material to be exited or discharged rearwardly over the top of the receiving hopper 33. Thus only clean ears of corn will fall downwardly into the hopper 33 and be deposited in the trailing wagon which is pulled behind the picker by reason of the wagon elevator 34 carrying the corn upwardly and rearwardly and thence dropping it into such a trailing wagon. The cooperative trash removing rolls 38 and 39 are arranged to rotate in the direction of the arrows 40 and 41. This insures that the rolls will be moving rearwardly at their cooperative or adjoining central surfaces so that trash moving toward the rolls will be extruded rearwardly.

A link arm 42 is arranged and constructed for each of the tubular housing members 35 and 36 to maintain relative horizontal stability of the discharge end of the tubular housings despite the raised and/or lowered position of the forwardly disposed gathering units. The link 42 is pivotally mounted at 43 on a bearing bracket 44 affixed to the forward and lower side of the corn receiving hopper 53 which as previously stated is mounted stationary relative to the tractor 10. The upper end of the link 42 is pivotally mounted at 45 on a bearing bracket 46 which in turn is mounted on top and substantially midway between the forward and rearward ends of the tubular housings 35 and 36. It will thus be seen that when the corn picking or gathering units 19 and 20 are raised about their pivotal mountings 21 on the tractor, that the rearwardly disposed tubular housings 35 and 36 do not swing downwardly as would normally be the case inasmuch as they project rearwardly of the hinge mounting 21. The links 42 maintain the tubular housings in a substantially fixed horizontal level relative to the corn receiving hopper 33. As clearly shown in Figure 2, the dash line position of the discharge end of the tubular housing 36 is shown at 47 which is still the same height as the discharge end when the picking unit 20 was down in its lowermost position as shown in full lines. However, the only appreciable movement of the discharge end of the tubular housing 36 is in a rearward direction and it still lies substantially over the corn receiving hopper 33. Thus, this construction insures the discharge of harvested and cleaned corn to the hopper 33 and further insures that the trash and broken stalks and the like will be discharged over the rear of the receiving hopper 33.

It is thus apparent that in the operation of the device of this invention the tubular housings 35 and 36 which are hinged on the corn picking units at a position above and slightly forwardly of the hinging of the corn picking units will function to constantly deliver harvested corn to the receiving hopper 33 without the possibility of missing that hopper during raising and/or lowering of the forwardly disposed picking units. Without the links 42 tending to maintain the discharge ends of the tubular housings 35 and 36 substantially horizontally level, the discharge ends of a rigid tubular member with respect to the corn picking unit would swing upwardly or downwardly depending upon the vertical adjustment of the forward end of the picking or gathering unit to the extent that much of the trash would be delivered directly into the corn receiving hopper when the gathering unit was raised to a relatively high or transport position. Thus, without the device of this invention, there is a serious impairment of separation of corn and trash material.

The various driving elements have not been discussed or described in detail inasmuch as they form no integral or new part of the present invention. It is sufficient to note that the discharge tubular housings for corn and trash material will remain on a substantially horizontal level despite raising and/or lowering of the corn picking and gathering units in their vertical adjustment of the forward ends about their rearwardly disposed hinges.

I am aware that numerous details of construction may be varied throughout a wide range without departing from the principles disclosed herein and I, therefore, do not propose limiting the patent granted hereon otherwise than as necessitated by the appended claims.

What is claimed is:

1. In a corn harvester comprising a frame supporting structure, wheels carrying said frame supporting structure, a corn picking unit having an intake end and a discharge end, said corn picking unit hingedly mounted adjacent its discharge end on said frame supporting structure, a corn receiving hopper affixed to said frame supporting structure and disposed rearwardly of the discharge end of said corn picking unit, a generally horizontally disposed tubular housing member hingedly attached at one end to said corn picking unit adjacent the discharge end thereof and arranged to receive crop material from said corn picking unit, said tubular housing member having its other end disposed over said corn receiving hopper for discharging corn therein, said tubular housing member arranged to guide corn from the picking unit to said hopper, and a link pivotally joined at one end to said tubular housing member intermediate its ends and at its other end pivotally joined to said frame supporting structure whereby the position of the discharging end of said tubular housing member over said hopper remains substantially unchanged vertically during adjustable swinging movement of said corn picking unit about its hinge mounting.

2. In a corn picker having an arcuately adjustable corn picking unit and a relatively stationary open top corn receiving hopper spaced therefrom, comprising a generally horizontally disposed longitudinally extending tubular housing member arranged and constructed to guide picked corn from said corn picking unit to said corn receiving hopper, said tubular housing member hingedly mounted at its forward end on said arcuately adjustable corn picking unit, and link means hingedly mounted at one end on said stationary corn receiving hopper and hingedly mounted at its other end on said tubular housing member spaced from its hinge mounting on said corn picking unit whereby the position of the discharge end of the tubular housing member remains substantially fixed vertically relative to the corn receiving hopper regardless of the arcuate position of the corn picking unit.

3. A device as set forth in claim 2 in which there is included a pair of transversely disposed trash removing rolls in the discharging end of said tubular housing member whereby the trash may be removed from said crop material rearwardly of said corn receiving hopper.

References Cited in the file of this patent
UNITED STATES PATENTS

| | | |
|---|---|---|
| 1,798,045 | Spangler | Mar. 24, 1931 |
| 2,015,708 | Carlson | Oct. 1, 1935 |
| 2,517,401 | Millard et al. | Aug. 1, 1950 |